United States Patent [19]

Poupiter

[11] Patent Number: 4,863,327
[45] Date of Patent: Sep. 5, 1989

[54] FLOATING CAGED NUT

[75] Inventor: Christian D. Poupiter, Le Mans, France

[73] Assignee: Simmonds S.A., France

[21] Appl. No.: 195,698

[22] Filed: May 18, 1988

[30] Foreign Application Priority Data

Jun. 10, 1987 [FR] France .................. 87 08075

[51] Int. Cl.⁴ ............... F16B 27/00; F16B 39/284
[52] U.S. Cl. ............................. 411/112; 411/85; 411/970
[58] Field of Search ............... 411/84, 85, 111–113, 411/966, 970, 999, 108, 183

[56] References Cited

U.S. PATENT DOCUMENTS 2,144,553 1/1939 Simmonds ........................ 411/85
2,381,233 8/1945 Summers .
3,164,191 1/1965 Grimm et al. .................... 411/85
3,695,324 10/1972 Gulistan ........................... 411/111
4,695,212 9/1987 Berelz ............................... 411/85

FOREIGN PATENT DOCUMENTS 597569 1/1948 United Kingdom .

Primary Examiner—Neill R. Wilson
Attorney, Agent, or Firm—Steinberg & Raskin

[57] ABSTRACT

The present invention concerns an improved floating caged nut having a first cage in the shape of a U in cross-section in which a collar nut is retained in a floating manner, this first cage being housed inside a second cage also in the shape of a U in cross-section and whose legs have openings co-operating with protruding lugs provided on the legs of the first cage to thus permit the removable mounting of the first cage in the second cage, by simple pinching of the legs.

7 Claims, 1 Drawing Sheet

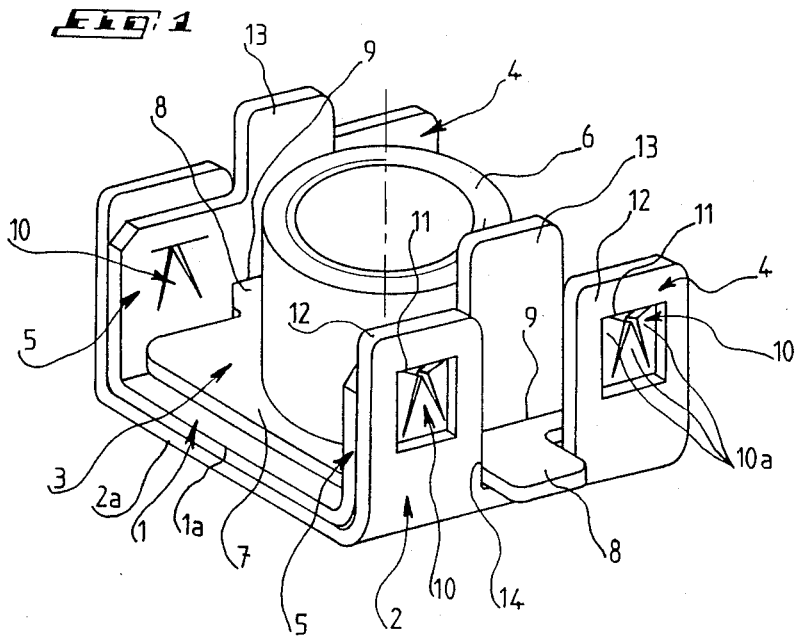
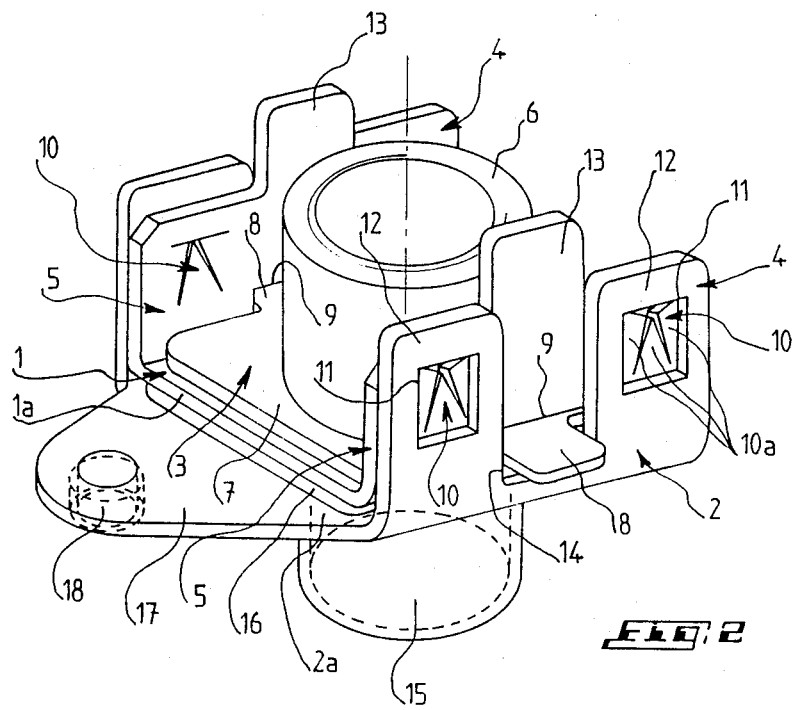

FLOATING CAGED NUT

BACKGROUND OF THE INVENTION

The present invention has essentially as an object an improved floating caged nut.

Known in the art are caged nuts comprising generally a cage substantially in the shape of a U in cross-section in which a collar nut is retained in a floating manner through the medium of an appropriate means.

This means can be formed of a circlip clipped on the sides of the cage and retaining the nut itself in the said cage.

Such a nut mounting is interesting in that it is possible, on the one hand, to take up plays during the mounting by screwing and, on the other hand, in that it permits the nut to be replaced after the circlip has been dismounted. However, this kind of mounting presents drawbacks in that, when the nut is to be replaced, the circlip remains difficult to dismount and to refit, and in that, moreover, the circlip can be mounted in a wrong manner. It results therefrom that, in the case where pieces are assembled in a rotating and/or a vibrating relationship, the badly mounted circlip can escape from the cage and provoke strong damage.

To remedy that, it has been proposed, in the U.S. patent application Ser. No. 119,051, to use, in the place of the circlip, a plate interposed between the bottom of the cage and the collar of the nut and provided on the one hand, with lugs co-operating with the cage in order to retain the plate in the cage and on the other hand, with tabs foldable back on the collar of the nut to retain the latter in the cage. Thus, it was possible to introduce the nut into or to withdraw it from the cage by folding the tabs.

However, such a caged nut presents drawbacks due to the fact that the folding of the tabs with the aid of a tool, in order to mount or to dismount the nut, is a delicate operation which is difficult to perform. Furthermore, the tabs are likely to break after a certain number of folding operations, so that the system becomes unusable and must be replaced, which gives rise to problems, in particular in the case where the cage of the nut is adhered or maintained on a piece by an adhesive strip.

SUMMARY OF THE INVENTION

Therefore, the present invention has as an object to meet these drawbacks by proposing an improved floating caged nut which comprises a collar nut which can be very easily mounted in the cage and withdrawn from the latter, and this without any risk of damage or of rupture, even after a long period of use.

For this purpose, the invention has as an object an improved floating caged nut of the type comprising a cage, or first cage, substantially in the shape of a U in cross-section in which a collar nut is retained in a floating manner, characterized in that the said cage is housed in a second cage also substantially in the shape of a U in cross-section and whose legs co-operate with the legs of the U of the first cage to provide the removable mounting of the first cage in the second cage.

According to another feature of the invention, the co-operation of the legs of the U of both cages is effected by at least one opening and at least one protruding lug provided respectively on the legs of the U of the second cage and of the first cage, or inversely.

According to a preferred embodiment, the legs of the U of the second cage are formed each of two tabs with an opening, whereas the legs of the U of the first cage comprise at least two lugs co-operating respectively with these openings.

More particularly, the aforesaid lug or lugs are made from one or several lancings with cuttings in both legs of the U of one of the cages.

According to still another feature of the invention, each of the legs of the U of the first cage comprises at its top one tab permitting the mounting and the withdrawal of this cage into or out of the second cage by pinching of the legs.

The base of the U of the second cage carries a rivet neck as well as at least one pin preventing this cage from rotating once secured by riveting to any piece.

According to a preferred embodiment, the neck of the aforesaid rivet is carried by a plate interposed between the base of the U of the first and of the second cage and goes through the base of the U of the second cage.

More particularly, both tabs of each leg of the U of the second cage define between each other a groove inside which lugs belonging to the nut collar and going through the legs of the U of the first cage can advantageously move.

BRIEF DESCRIPTION OF THE DRAWINGS

Other advantages and features of the invention will appear more clearly as the following detailed description proceeds with reference to the appended drawings, given by way of example only, and wherein:

FIG. 1 is a perspective view of a floating caged nut according to the principles of the invention, and FIG. 2 is a perspective view of the nut shown in FIG. 1, but equipped with riveting means.

DESCRIPTION OF THE PREFERRED EMBODIMENTS

Referring to FIG. 1, it is seen that a floating caged nut according to this invention comprises essentially a first cage 1 substantially in the shape of a U in cross-section and in which a nut 3 is retained in a floating manner, this first cage being housed inside a second cage 2 also substantially in the shape of a U in cross-section, so that the legs 4 of the second cage 2 can co-operate with the legs 5 of the first cage 1 to permit the removable mounting of the first cage inside the second cage, as will be described later with more details.

The nut itself comprises, as known per se, an inwardly threaded neck 6 and a collar 7 provided with opposed lugs 8 going through openings 9 of the legs 5 of the first cage 1.

Each of the legs 5 of the U forming the first cage 1 comprises lugs 10 protruding towards the outside of the said legs and likely to fit by clipping into openings 11 provided in each leg 4 of the U forming the second cage 2.

The lugs 10 can be made in any appropriate way, namely they can be formed for example, as shown, of groups of three little lugs 10a cut and made from lancing in both legs 5 of the U of the first cage 1.

It could be perfectly possible, without departing from the scope of the invention, to carry out the reverse arrangement with respect to that shown in the Figures, i.e. the lugs 10 would be provided on the legs 4 of the second cage 2 and would protrude towards the interior of the said cage, and the openings 11 would be formed in the legs 5 of the first cage 1.

According to the example shown, each leg 4 of the U forming the second cage 2 is formed of two tabs 12 each of which comprising one opening such as 11 in which a group of small lugs 10a can fit or be clipped.

At 13 are shown tabs provided respectively at the upper part of legs 5 of the first cage 1 and permitting, through pinching, the mounting or the withdrawl of the cage 1 which bears the nut 3 into or out of the second cage 2, as will be described later.

The tabs 12 of the legs of the second cage 2 define between each other, as seen in the Figures, a groove 14 inside which the lugs 8 belonging to the collar 7 of the nut 3 can move, which lugs go through the legs 5 of the first cage 1 in a floating manner by going through the abovementioned openings 9. It is to be noted here that the openings 9 are broader than the lugs 8, so as to permit an horizontal movement of these lugs which can also move horizontally inside groove 14 between the tabs 12 of the second cage 2.

Although not appearing in FIG. 1, it is to be noted that the collar 7 of nut 3 comprises, as known per se, an opening located vertically under the threaded neck 6, in order to provide a passageway for a threaded element, such for example as a screw. Also, the base 2a of the U forming the second cage 2 comprises an opening located vertically under the neck 6 of the nut 3, for the same reason as mentioned above.

The opening formed in the aforesaid base 2a is advantageously used to receive a rivet neck which will be described in detail now with reference to FIG. 2.

This rivet neck, shown at 15, is solid with a plate 16 interposed between the base 2a of the second cage 2 and the base 1a of the first cage 1.

The base 2a of the second cage 2 comprises preferably, and in the same plane, an extension 17 carrying a pin, dog point or the like 18 at its lower part.

Therefore, in order to secure the caged nut according to FIG. 2 to a piece, the rivet neck 15 is introduced into an opening formed in this piece, and the pin 18 is introduced into another opening of the said piece, so that after riveting by jolting and splaying of the neck 15, the cage 2 and all the pieces carried by it will be prevented from rotating, under the effect of screwing for example, owing to the pin 18.

The caged nut shown in FIG. 1 can be secured by means of adhesive bonding or of an adhesive strip on any piece, at the base 2a of the second cage 2, whereas the nut shown in FIG. 2 will be naturally secured to the piece by means of riveting.

For a better understanding, the mounting and dismounting of the nut will now be briefly explained.

Referring first to FIG. 1, it is understood that when the resilient legs 5 of cage 1 are caused to come closer with respect to each other, simply by pinching with the aid of one's fingers and of tabs 13, the lugs 10 will come out of the openings 11 formed in the legs 4 of the second cage 2, so that the first cage 1 which carries the nut 3 can be very easily extracted from the second cage 2. This being done, it is very easy to extract the nut 3 from the cage 1 to replace it, by causing the legs 5 to move apart, so as to extract the lugs 8 from the openings 9 formed in the legs 5.

Once a new nut is disposed inside cage 1, this cage will be easily introduced into cage 2 by pinching once more the legs 5, so that the lugs 10 fit by clipping into the openings 11 of legs 4 of the second cage 2.

Referring now to FIG. 2, the mounting and dismounting are carried out in the same way as previously, except that here, the plate 16 which carries the rivet neck 15 is mounted inside the base 2a of the second cage 2 through the opening formed in it, before the first cage 1 is introduced into this second cage. When this second cage is riveted on a piece owing to the rivet neck 15, by means of the splaying of the end of the neck which rests against the edge of the opening of the piece into which the said neck is introduced, the cage 1 can be dismounted from and refitted into the cage 2, exactly as explained in the foregoing.

It is still to be noted here that the nut according to this invention may optionally comprise a rivet neck, as required. One just optionally has to provide the nut with a plate 16 carrying the rivet neck 15.

Naturally, the invention is by no way limited to the embodiments described and illustrated which have been given by way of example only.

Thus, it would be perfectly possible to provide a rivet neck solid with or in one piece with the base 2a or the second cage 2.

Also, the pin 18 can be optionally provided. Similarly, the lugs on the legs of a cage and the openings co-operating with these lugs in the legs of the other cage can be provided in any number.

What is claimed is:

1. An improved floating caged nut of the type comprising a first cage substantially in the shape of a U in cross-section in which a collar nut is retained in a floating manner, wherein said first cage is housed in a second cage also substantially in the shape of a U in cross-section and having legs co-operating with legs of the U of the first cage to provide for removable mounting of the first cage in the second cage, wherein the legs of the U of said second cage are each formed of two tabs each of which comprising an opening, and the legs of the U of said first cage comprise at least two lugs co-operating respectively with these openings.

2. A caged nut according to claim 1, wherein the co-operation of the legs of the U of both cages is effected by at least one opening and at least one protruding lug provided respectively on the legs of the U of the second cage and of the first cage, or inversely.

3. A nut according to claim 1, wherein the lugs are made from one or several lancings with cuttings in both legs of the U of the first cage.

4. An improved floating caged nut of the type comprising a first cage substantially in the shape of a U in cross-section in which a collar nut is retained in a floating manner, wherein said first cage is housed in a second cage also substantially in the shape of a U in cross-section and having legs cooperating with legs of the U of the first cage to provide for removable mounting of the first cage in the second cage, wherein each of the legs of the U of the first cage comprises, at its top, one tab permitting mounting and withdrawal of this first cage into and out of the second cage by pinching of said legs of said first cage.

5. An improved floating caged nut of the type comprising a first cage substantially in the shape of a U in cross-section in which a collar nut is retained in a floating manner, wherein said first cage is housed in a second cage also substantially in the shape of a U in cross-section and having legs co-operating with legs of the U of the first cage to provide for removable mounting of the first cage in the second cage, wherein the co-operation of the legs of the U of both cages is effected by at least one opening and at least one protruding lug provided respectively on the legs of the U of the second cage and of the first cage, or inversely, wherein the second U-shaped cage comprises a base carrying a rivet neck and at least one pin preventing this second cage from rotating once secured through riveting to any piece.

6. A nut according to claim 5, wherein the rivet neck is carried by a plate interposed between a base of the U of the first cage and the base of the second cage, and extends through the base of the U of the second cage.

7. A nut according to claim 1, wherein both tabs of each leg of the U of the second cage define between each other a groove inside which lugs belonging to the nut collar and extending through the legs of the U of the first cage can move.

* * * * *

UNITED STATES PATENT AND TRADEMARK OFFICE
CERTIFICATE OF CORRECTION

PATENT NO. :   4,863,327
DATED      :   September 5, 1989
INVENTOR(S):   Christian D. Pouplier It is certified that error appears in the above—identified patent and that said Letters Patent is hereby corrected as shown below:

On the title page, under item [19] and in item [75], "Poupiter" should be --Pouplier--

Signed and Sealed this

Sixteenth Day of October, 1990

Attest:

HARRY F. MANBECK, JR.

*Attesting Officer*  *Commissioner of Patents and Trademarks*